US009251551B2

(12) United States Patent
Hall et al.

(10) Patent No.: US 9,251,551 B2
(45) Date of Patent: *Feb. 2, 2016

(54) BINDLESS MEMORY ACCESS IN DIRECT 3D

(75) Inventors: Jesse David Hall, Santa Clara, CA (US); Jeffrey A. Bolz, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 13/078,848

(22) Filed: Apr. 1, 2011

(65) Prior Publication Data

US 2011/0242125 A1     Oct. 6, 2011

Related U.S. Application Data

(60) Provisional application No. 61/321,090, filed on Apr. 5, 2010.

(51) Int. Cl.
*G06T 1/20*     (2006.01)
(52) U.S. Cl.
CPC ........................................ *G06T 1/20* (2013.01)
(58) Field of Classification Search
CPC .................................... G06T 1/00; G06T 1/20
USPC ......... 345/522, 582, 559, 501–506, 531, 530, 345/545
See application file for complete search history.

(56) References Cited

U.S. PATENT DOCUMENTS

| 6,295,068 | B1* | 9/2001 | Peddada et al. | 345/419 |
| 7,139,003 | B1* | 11/2006 | Kirk et al. | 345/531 |
| 8,055,856 | B2* | 11/2011 | Coon et al. | 711/152 |
| 8,176,233 | B1* | 5/2012 | Karamcheti | 711/103 |
| 2008/0246773 | A1* | 10/2008 | Jiao et al. | 345/522 |
| 2008/0303835 | A1* | 12/2008 | Swift et al. | 345/522 |

\* cited by examiner

*Primary Examiner* — Phi Hoang
*Assistant Examiner* — Michael Le
(74) *Attorney, Agent, or Firm* — Artegis Law Group, LLP (57) ABSTRACT

One embodiment of the present invention sets for a method for accessing data objects stored in a memory that is accessible by a graphics processing unit (GPU). The method comprises the steps of creating a data object in the memory based on a command received from an application program, transmitting a first handle associated with the data object to the application program such that data associated with different graphics commands can be accessed by the GPU, wherein the first handle includes a memory address that provides access to only a particular portion of the data object, receiving a first graphics command as well as the first handle from the application program, wherein the first graphics command includes a draw command or a compute grid launch, and transmitting the first graphics command and the first handle to the GPU for processing.

24 Claims, 5 Drawing Sheets

BINDLESS MEMORY ACCESS IN DIRECT 3D

CROSS-REFERENCE TO RELATED APPLICATIONS

This application claims benefit of U.S. provisional patent application entitled "Bindless Memory Access", filed on Apr. 5, 2010 and having Ser. No. 61/321,090.

BACKGROUND OF THE INVENTION

1. Field of the Invention

The present invention relates generally to accessing texture objects and image objects in GPU memory and, more specifically, to a bindless texture and image application programming interface (API) for Direct 3D (D3D).

2. Description of the Related Art

Direct 3D treats graphics concepts like textures, vertex buffers, shaders, constant buffers, and the like as opaque "objects" without exposing, to an application that references the objects, address details of the objects within a memory. Typically, the application binds such objects together and into a fixed set of hardware "units," e.g., texture units, vertex streams, constant buffer slots, or the like, through, e.g., API calls, without ever being aware of or having access to a physical address of the objects within the memory. Between the execution of graphics commands, e.g., Draw( ) commands, application programs frequently require access to different objects. In turn, the API is required to bind such new objects to the set of hardware units, which is costly. For example, significant processing overhead is introduced by requiring a driver to iterate a plurality of pointers per object to validate that the objects are properly located within the memory. As a result, a substantial bottleneck has developed in modern 3D graphics processing.

As the foregoing illustrates, what is needed in the art is a mechanism for accessing data objects without causing a graphics driver bottleneck.

SUMMARY OF THE INVENTION

One embodiment of the present invention sets forth a method for accessing data objects stored in a memory that is accessible by a graphics processing unit (GPU). The method comprises the steps of creating a data object in the memory based on a command received from an application program, transmitting a first handle associated with the data object to the application program such that data associated with different graphics commands can be accessed by the GPU, wherein the first handle includes a memory address that provides access to only a particular portion of the data object, receiving a first graphics command as well as the first handle from the application program, wherein the first graphics command includes a draw command or a compute grid launch, and transmitting the first graphics command and the first handle to the GPU for processing.

One advantage of the disclosed method is that the GPU driver does not have to operate on the data objects each time they are used.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
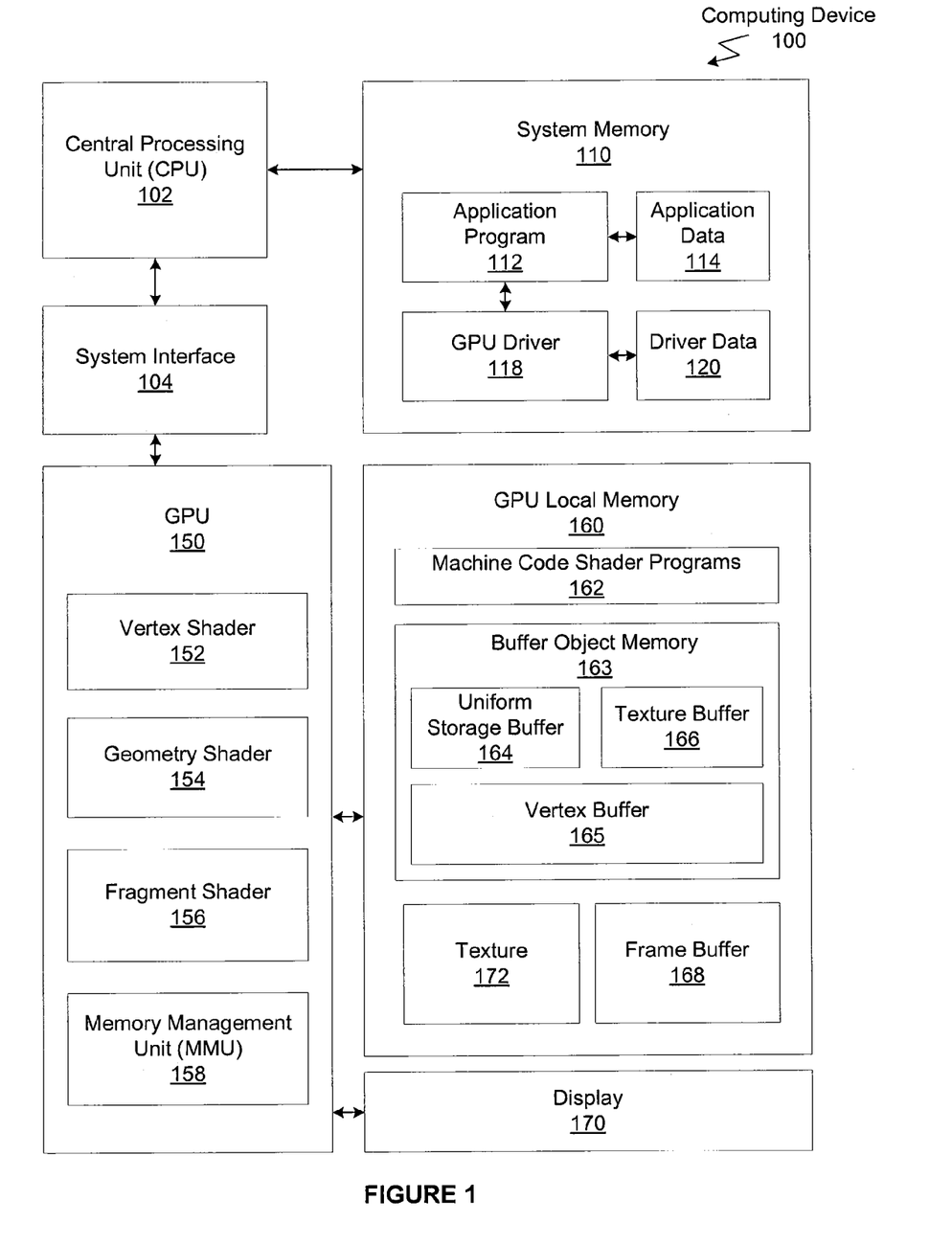
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163, texture 172 and frame buffer 168. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays. The vertex buffer 165 stores data elements describing the position and other attributes of vertices provided as inputs to the vertex shader 152.

The GPU local memory 160 includes texture 172 and frame buffer 168. The frame buffer 168 includes at least one two-dimensional surface that is used to drive the display 170. The frame buffer 168 may include more than one two-dimensional surface so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112. The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
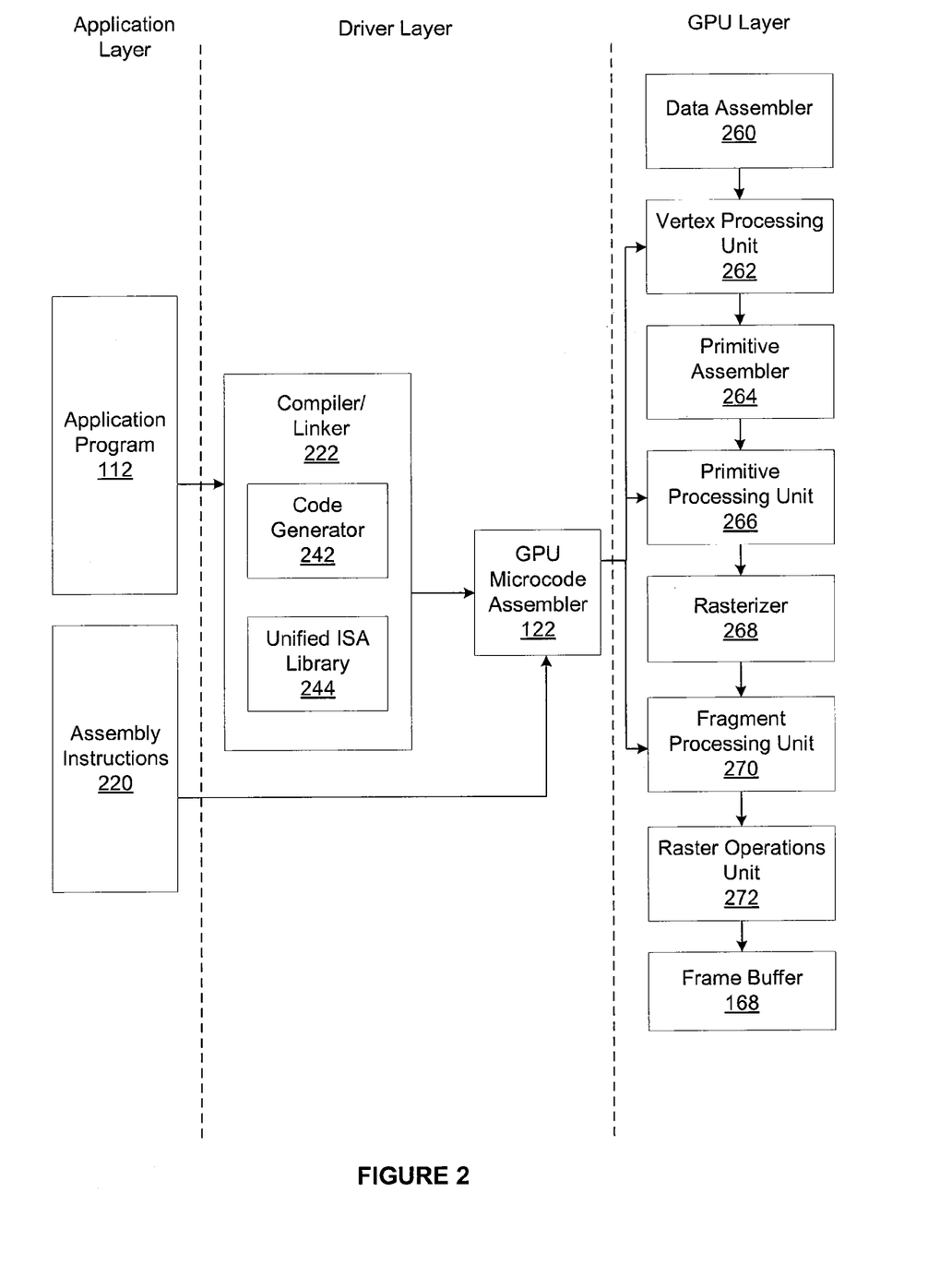
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. The primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan-converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
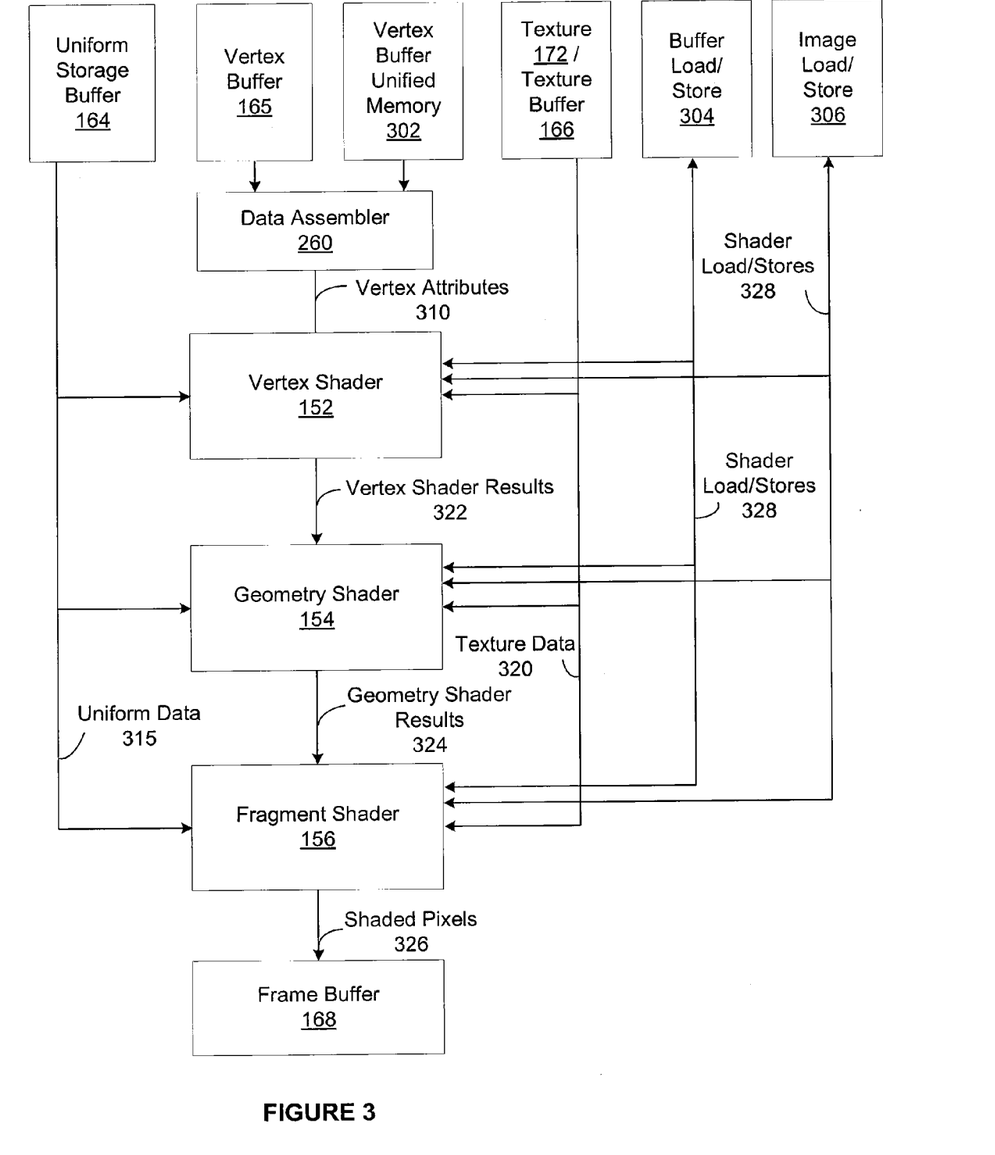
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164 and texture data 320 from the texture buffer 166 or texture 172. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164 and texture data 320 from the texture buffer 166 or texture 172. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164 and texture data 320 from the texture buffer 166 or texture 172. The output of the fragment shader 156 includes a stream of shaded pixels 326 that are written to the frame buffer 168.

In addition, each of the vertex shader 152, the geometry shader 154 and the fragment shader 156 may retrieve data from and write data to buffer objects (illustrated as shader load/stores 328) stored within the buffer object memory 163 via the buffer load/store mechanism 304. Similarly, each of the vertex shader 152, the geometry shader 154 and the fragment shader 156 may retrieve texture data and write texture data to image units stored within texture memory 172 via the image load/store mechanism 306.

As will be familiar to someone skilled in the art, Direct3D implementations also support a compute pipeline in addition to the graphics pipeline described above. Instead of a pipeline of shader stages intermixed with fixed-function stages, a compute pipeline is a single compute shader stage. Just as an application program launches work to the graphics pipeline using a Draw command, it launches work to the compute pipeline with a Dispatch command. A Dispatch command initiates execution of a grid of threads on the compute shader unit, and each thread executes a machine code compute shader. The feature set of compute shader and graphics shaders are nearly uniform; it is understood that unless explicitly excluded, any feature of graphics shaders is also available to compute shaders. The features of the present invention apply to both graphics and compute shaders.

In some implementations, the compute pipeline may be implemented by the graphics driver by translating the compute shader to a fragment shader 156, configuring the graphics pipeline to use a trivial vertex shader 152 and geometry shader 154, and render a quad such that the number of fragments rasterized and executed by the fragment shader 156 is the desired number of compute threads.

Bindless Memory Access in Direct 3D

The present invention provides a technique for allowing shaders to read from and write to buffer resources (e.g., vertex buffers), shader resource views (e.g., read-only portions of texture resources), and unordered access view (e.g. read-write portions of texture resources) through an unlimited number of anonymous access points (hereinafter referred to as "handles"). The handle includes or refers to an address within the GPU local memory 160 and allows the shader to directly access data stored at the address. The present invention also adds a small data buffer that can be read by shaders and updated at very high frequency, e.g., per pipeline invocation, with minimal overhead. This data buffer is used to pass one or more handles and other information needed by the shaders to determine which resources to use.

Figure 4:
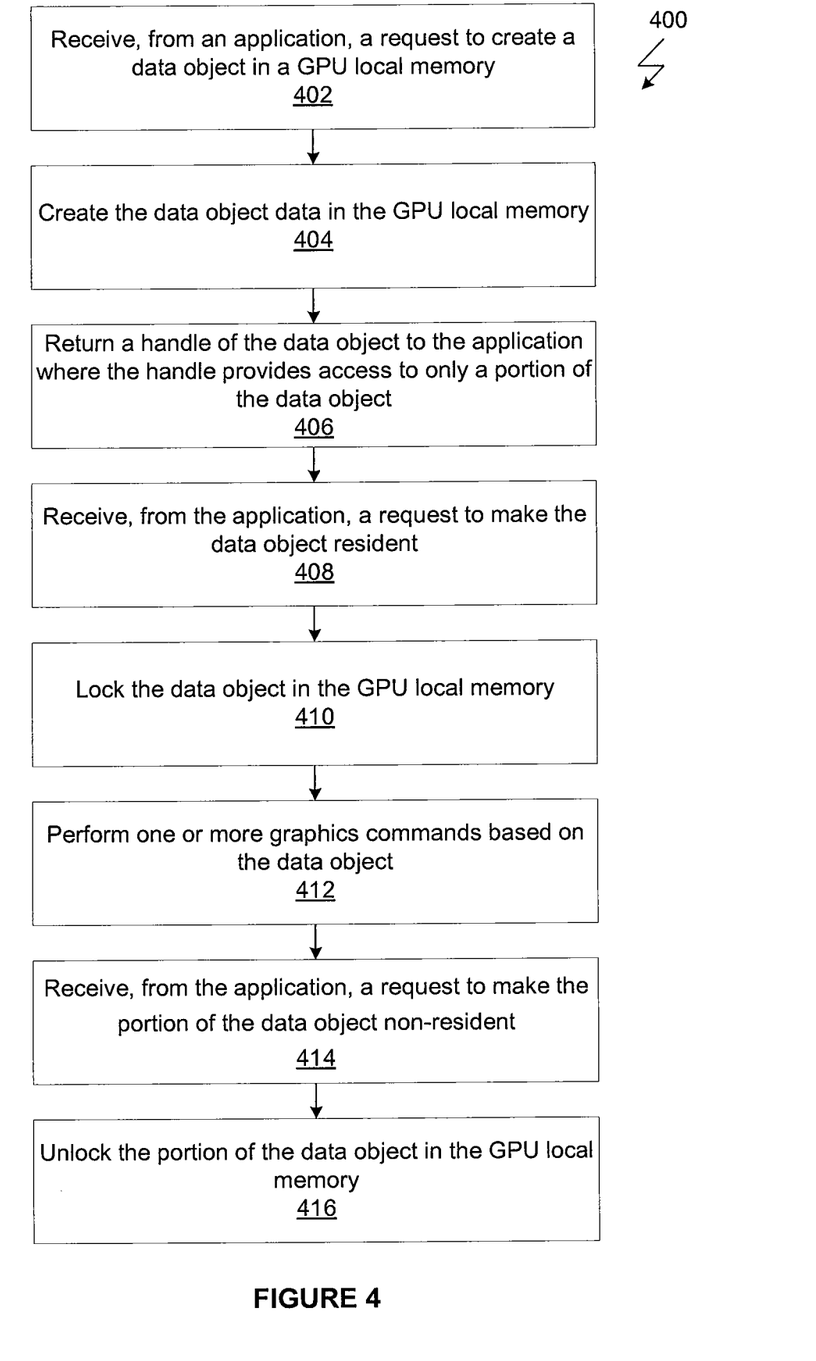
FIG. 4 is a flow diagram of method steps for creating a handle to a resource view of a texture object and making the object resident in the GPU local memory 160, according to one embodiment of the present invention.

FIG. 4 is a flow diagram of method steps for creating a handle to a resource view of a texture object and making the object resident in the GPU local memory 160, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the GPU driver 118 receives a request from the application program 112 to create a texture object in the GPU local memory 160. At step 404, the GPU driver 118 creates the data object based on the request received from the application program 112. At step 406, based on the request received from the application program 112, the GPU driver 118 returns a handle associated with only a portion of the data object—i.e., a resource view—created in the GPU local memory 160. At step 408, the GPU driver 118 receives a request from the application program 112 to make the data object resident such that the portion of the data object is guaranteed to be accessible to the GPU 150. In response, at step 410, the GPU driver 118 locks the data object in the GPU local memory 160.

At step 412, a shader engine in the GPU 150, such as the vertex shader 152, performs one or more graphics commands on the portion of the resident data object, e.g., a graphics draw command. At step 414, the GPU driver 118 receives a request from the application program 112 to make the data object non-resident. In response, at step 416, the GPU driver 118 unlocks the data object in the GPU local memory 160. When the data object is made non-resident, the data object can no longer be accessed by a shader engine in the GPU 150.

In one embodiment of the present invention, the handle associated with a data object is also a CPU address within a CPU address space. In another alternate embodiment, the handle is a 64-bit unsigned integer. In yet another alternate embodiment, the handle is a high-level language pointer that points to the corresponding data object in the GPU local memory 160.

Figure 5:
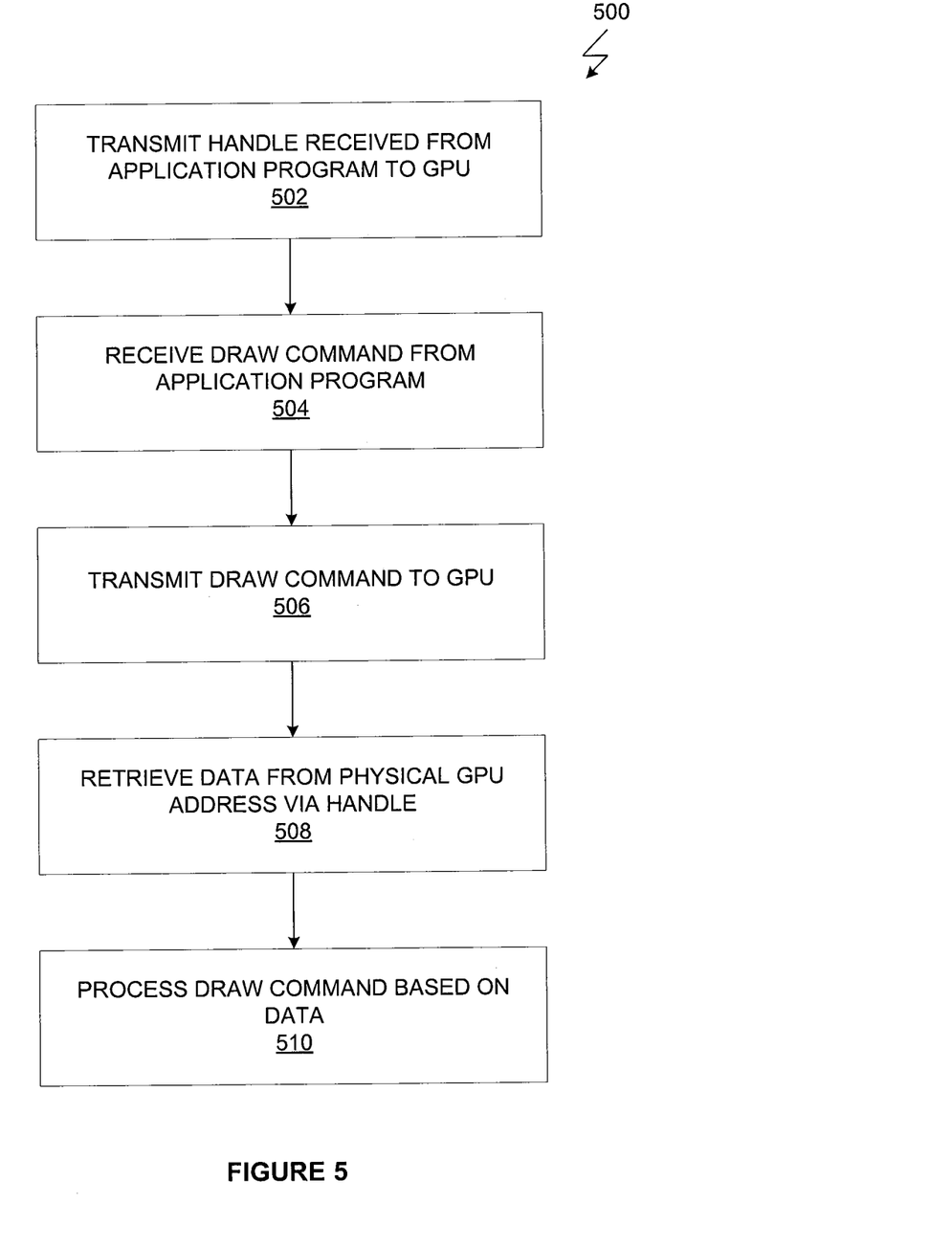
FIG. 5 is a flow diagram of method steps for loading data via a shader program using handles associated with resource views of data objects, according to one embodiment of the present invention.

FIG. 5 is a flow diagram of method steps for loading data via a shader program using handles associated with resource views of data objects, according to one embodiment of the present invention. Although the method steps are described in conjunction with the systems for FIGS. 1-3, persons skilled in the art will understand that any system configured to perform the method steps, in any order, is within the scope of the invention.

The method 500 begins at step 502, where the GPU driver 118 transmits handles associated with resource views of data objects received from the application program 112 to the GPU 150. Importantly, the GPU driver 118 does not have to access the data objects within the driver data 120 to transmit the handles to the GPU 150. At step 504, the GPU driver 118 receives a draw command from the application 112 and, in response, at step 506, transmits the draw command to the GPU 150 for further processing.

At step 508, the GPU 150 retrieves the portions of the data objects associated with the handles from the GPU local memory 160. Note that, in some cases, the handle may not refer to a data object but to a different resource view handle, thereby providing an indirection technique that can be used to easily reference groups of portions of data objects. At step 510, the GPU 150 processes the draw command received from the GPU driver 118 based on the data retrieved from the GPU local memory 160.

Extensions to Direct 3D Shading Language and related APIs to support the foregoing techniques are discussed below. Persons skilled in the art will appreciate that the information in this section should be considered in conjunction with the Direct3D 11 specification. These changes are pure additions to the D3D API and shading language—not modifications or removals of existing functionality. Advantageously, bindless memory accesses can be intermixed with bound memory accesses, even for the same resource within the same shader invocation, thereby providing backward compatibility.

As described above, to perform bindless reads of a resource view, the resource view is associated with a handle that applications retrieve and make available to shaders. Shaders are then able to use this handle with the various existing texture and load instructions. Before accessing a resource view, the application informs the GPU driver 118 that the resource view is in use.

Texture instructions (e.g., sample*, ld*, gather4*) are extended to support bindless ShaderResourceView and SamplerState objects. The identifiers for these objects are opaque implementation-defined handles. In D3D high-level shading language (HLSL), the existing object types are extended to support construction from these handles, but otherwise behave exactly like their bound counterparts.

Additionally, a new memory read is introduced, and avoids a typical two-step read (first descriptor, then data) and associated overhead when data is read via bound resource views.

This call is not supported and will return zero for structured buffers and USAGE_STAGING buffers. Structured buffers have an opaque and possibly non-linear layout, and therefore the address cannot be manipulated with predictable results. However, a handle may be modified before being passed to a shader, and offsets from a base address of the handle can be added in either host or shader code.

Binding changes give explicit indications of when and how resources will be used by the pipeline, and these events may be used to ensure the data is resident in GPU-accessible memory, i.e., GPU local memory 160. Bindless accesses require a new mechanism to communicate this information and are organized as follows:

```
#define D3Dxx_PIN_ACCESS_READ              0x00000001
void ID3DxxDeviceContext::PinResources(UINT Access, UINT NumResources,
ID3DxxResource * const * ppResources);
void ID3DxxDeviceContext::UnpinResources(UINT NumResources, ID3DxxResource
* const * ppResources);
```

The handle is the address (in the GPU local memory 160 address space) of the buffer contents. In HLSL, these are exposed as C-style pointers, and data is read directly without bounds checking, format conversion, or other processing. In addition to the performance advantages described herein, pointers allow simple representation of linked data structures (lists, trees, graphs, etc.) in buffers with non-homogenous contents, or across multiple buffers.

In one embodiment, both GPU local memory 160 addresses and handles are 64-bit. Some implementations, however, may not use all 64 of the bits. The value zero is reserved to indicate invalid addresses and handles. The resource view handles and sampler state handles are organized as follows:

```
typedef UINT64 D3Dxx_SHADER_RESOURCE_VIEW_GPU_HANDLE;
D3Dxx_SHADER_RESOURCE_VIEW_GPU_HANDLE
ID3DxxShaderResourceView::GetGPUHandle( );
typedef UINT64 D3Dxx_SAMPLER_GPU_HANDLE;
D3Dxx_SAMPLER_GPU_HANDLE ID3DxxSamplerState::
GetGPUHandle( );
```

Handles for resource view and sampler state objects are opaque references to implementation-defined data structures that encompass both the data and state such as format, size, and the like. Handles are constant for the lifetime of the object. Mapping a USAGE_DYNAMIC resource for WRITE_DISCARD does not invalidate the handle of any resource views of a data object—that is, implementations must be able to change the data referred to by the resource view without changing the identity of the resource view itself.

Buffer GPU addresses are organized as follows:

```
typedef UINT64 D3Dxx_BUFFER_GPU_ADDRESS;
D3Dxx_BUFFER_GPU_ADDRESS ID3DxxBuffer::GetGPUAddress( );
```

The address returned by ID3DxxBuffer::GetGPUAddress( ) command is the address of the actual buffer data in the GPU local memory 160 address space. The address of a buffer is constant for its lifetime, except in the case of USAGE_DYNAMIC buffers, where mapping a dynamic buffer for WRITE_DISCARD makes the previous address invalid for any subsequent pipeline invocations.

The commands PinResources( ) and UnpinResources( ) increment and decrement a reference count, and the resource is pinned as long as the count is non-zero. Unpinning a resource that is not pinned results in an error and does not decrement the reference count. When a resource is bound, it is implicitly pinned, though without affecting the pin reference count.

While pinned to a context, pipeline invocations from that context can safely perform bindless accesses of the resource, either directly for buffers or indirectly through resource views. Unpinning a resource does not cause the data object associated therewith to be evicted from memory, but rather makes the data object eligible for eviction if the underlying memory manager requires the memory for, e.g., different data objects. Each (context, resource) pair is associated with a pinned state, and being pinned on one context does not imply that other contexts can safely use bindless accesses with the resource. This per-context pinned state implies that, when a shared resource is pinned for some context on one device, it is not automatically pinned for any other device—in the same or a different process—which has a reference to it.

Pinning a resource is orthogonal to other features that allow partial residency, such as a per-resource MinLOD clamp or sparse textures. More specifically, when pinned, any part of the resource made accessible through those features is available and, when unpinned, no parts of the resource are available. Sampler state objects do not correspond to a significant amount memory, and, as a result, residency control of sampler state objects is unnecessary and they are always available.

When a resource becomes pinned, the implementation performs the same hazard and coherence resolution tasks when binding a resource or view to the graphics pipeline. Attempts to pin a resource for read access while it is bound for write access will be ignored, as will attempts to bind the resource for write access while it is pinned for read access. After a resource becomes unpinned, subsequent uses (either bound or bindless) are automatically ordered and coherent with those performed before the resource is unpinned. While pinned, a resource may be modified or read without a binding change using "blit" API commands such as CopyResource. As with bound resources, these are automatically ordered and coherent with bindless reads from prior and subsequent pipeline invocations.

Pinning does not interact significantly with Map synchronizations. Only USAGE_DYNAMIC resources can be both pinned and mapped. Supported map types on dynamic resources include DISCARD and NOOVERWRITE. Performing a DISCARD map on a pinned dynamic resource—in addition to changing the address of the resource but not the identity of any views thereof—retains the pin count of the resource. NOOVERWRITE mappings are not synchronized and have no effect on pinning or the resource address.

Changes to high-level shading language include a new uintptr_t type which can represent a handle. This type has the same size and alignment as doubles (that is, 64-bit size and alignment). This type can be used in place of a uint2 for memory reads and writes, for example as the return type of TextureXX<uint2>::Load( ) or as the value operand to RWByteAddressBuffer::Store2( ).

Currently in HLSL, object declarations corresponding to resource view and sampler state objects must be declared at a global scope within an application program. When the declaration is in function scope, it must be explicitly initialized from a uintptr_t value. Both constructor and assignment syntax are supported. For example:

```
uintptr_t mytex_handle = GetTextureHandle( );   // application-defined
Texture2D<float4> mytex(mytex_handle);          // constructor syntax
Texture2D<float4> mytex = mytex_handle;         // assignment syntax
```

The object does not have to be initialized at declaration, but using an object that the compiler cannot prove has been initialized results in a compile-time error. Outside of function scope, the declaration corresponds to a well-defined memory location and the initialization from uintptr_t can be performed implicitly. That is, the memory location is treated as a uintptr_t for layout purposes, but the object is created automatically from a handle stored at that location. For example:

```
struct Object {
    Texture2D<float4> diffuse_tex;
    // ...
};
cbuffer cb : register(b0) {
    StructuredBuffer<Object> objects;        // c[0][0].xy
    SamplerState diffuse_sampler;            // c[0][0].zw
};
float4 main(float2 texcoord: TEXCOORD, uint objid: OBJID): SV_Target0
{
    return objects[objid].diffuse_tex.Sample(diffuse_sampler, texcoord);
}
```

Here, the StructuredBuffer object is initialized from a uintptr_t stored in c[0][0].xy, the diffuse_tex Texture2D object is initialized from a uintptr_t stored at byte offset objid*sizeof(Object) within the objects buffer, and the diffuse_sampler object is initialized from uintptr_t stored in c[0][0].zw.

Bindless objects are associated with a GetHandle( ) method which returns the uintptr_t value that was used to initialize the bindless object. Attempting to use an object initialized from an invalid handle produces undefined results. For new classes of errors, such as initializing from a handle that does not correspond to any object, undefined behavior may result in a "device removal" error.

Typically, D3D does not allow indexed texture access where the index might diverge within a pipeline invocation. This restriction would significantly decrease the utility of bindless texture access, e.g., within a ray tracing application. Accordingly, this restriction is lifted for both dynamically-indexed bound texture access and bindless texture access. In pixel shaders, derivatives are still calculated from texture coordinates within a pixel quad, even if each thread in the quad is accessing a different texture. Calculating the LOD from the derivatives is performed on a per-thread basis using the dimensions of the texture accessed by that thread.

Bindless access to buffer contents may be performed via C-style pointers, with some restrictions. Pointer arithmetic is allowed, using the same rules as C. Pointers may be dereferenced using the unary "*" operator, the "->" operator, and the array operator.

Pointers are declared and initialized similarly to resource view and sampler state declarations. When declared in a well-defined memory location, they are automatically initialized with the value stored therein. When declared in local scope, they can be initialized and assigned from uintptr_t values. A pointer can be copied to a uintptr_t value using explicit constructor syntax:

```
const float* data = /*...*/;
uintptr_t ptr = uintptr_t(data);
```

Dereferencing a pointer which does not fall within any pinned buffers causes undefined behavior, potentially including an error of "device removal." No bounds-checking is performed, except that data belonging to another device will never be read or modified. Dereferencing a valid but unaligned pointer follows the same rules as unaligned addresses with byte-addressable buffers. The address-of operator (&) is supported in cases where it maps to simple arithmetic on an existing pointer value. Advantageously, the address of a field within a structure may be obtained. The "address-of" operator does not require new support. In a function, the operand to the address-of operator must be known to be valid without considering the calling context, e.g., this code is not valid even though if fully in-lined it would be valid:

```
void f(int x) {
    const int* y = &x;   // error: x not known
    // ...
}
// ...
const int* z = ...;
f(z[0]);
```

Two new intrinsics are also added to support data structure manipulation: sizeof( ) and offsetof( ). These behave as in C, and are resolved at compile time. The uintptr_t type in HLSL is mapped to two components of a vector, using the same rules as doubles.

In the Direct3D intermediate shader language, bindless texture and sampler accesses use syntax similar to bound textures and samplers. A new operand type and corresponding human-readable name ('th' and 'sh' here, where 'h' means handle) are implemented to distinguish the two cases. For example:

```
// load objects handle
mov r0.zw, cb[0][0].xy
// read diffuse_tex handle from objects buffer
ld_structured(structured_buffer, stride=8)(mixed,mixed,mixed,mixed) \
    r0.x, v1.x, l(0) th[r0.zw].xxxx
ld_structured(structured_buffer, stride=8)(mixed,mixed,mixed,mixed) \
    r0.y, v1.x, l(4) th[r0.zw].xxxx
```

```
// load diffuse_sampler handle
mov r0.zw, cb[0][0].zw
// read color from diffues_tex using diffuse_sampler
sample(texture2d)(float,float,float,float) \
    r0.xyzw, v0.xyxx, th[r0.xy].xyzw, sh[r0.zw]
// output result
mov o0.xyzw, r0.xyzw
```

Bindless buffer reads use a new ld_pointer instruction:
ld_pointer dst0[.mask], srcByteAddress.swizzle This instruction reads from one to four 32-bit components from memory as determined by the dst0 mask. The post-swizzle ".xy" components of srcByteAddress include the address to begin reading from (least-significant bits in the .x component, most-significant in the .y component, as with doubles).

Pipeline parameters are a new API feature that allows a small fixed amount of data to be changed extremely frequently, e.g., per draw call, with minimal overhead. The graphics and compute pipelines each get independent parameter data. The graphics pipeline parameters are visible to all shader stages. By significantly constraining the total size of the fixed amount of data, assuming high-frequency changes, and eliminating support for binding, pipeline parameters can be optimized.

Pipeline parameters are set through two new APIs, one for each pipeline:

```
void SetDrawParameters(UINT StartOffset, UINT NumParameterBytes, void*
pParameterData)
void SetDispatchParameters(UINT StartOffset, UINT NumParameterBytes, void*
pParameterData)
```

The parameter data size is fixed by the API. The parameters "StartOffset" and "NumParameterBytes" cannot exceed this fixed data size. Contents of the parameter buffer before StartOffset or after StartOffset+NumParameterBytes are unmodified by these calls. Pipeline parameter variables are declared at global scope with a "parameter" keyword acting as a storage location qualifier. They support register binding syntax for manual layout of the parameter buffer, e.g. "parameter const Mesh* mesh : register(p0)". Any parameter variables not manually bound are packed into the parameter buffer using the same rules as constant buffers. Reflection APIs are updated to allow discovery of the parameter variable locations.

Because the same parameter data is visible to all shader stages, shaders will need to use the same declarations to get sensible results. The HLSL compiler thus considers all parameter declarations, whether used or not, when assigning locations to parameter variables.

The extension adds new sources of unrecoverable errors, which result in a non-specific "device removal" error. To alleviate this issue, the ReportErrorCb callback is modified to accept additional details about device removal errors. This could be exposed to applications through similar changes to the existing ID3DxxDevice::GetDeviceRemovalReason( ) API. This information will be used during development rather than on end-user systems, so consistent reporting between implementations is not required. The error types are as follows:

```
#define D3DxxDDI_DEVICE_REMOVED_REASON_UNKNOWN          0x00000000
#define D3DxxDDI_DEVICE_REMOVED_REASON_ACCESS_VIOLATION
0x00000001
#define D3DxxDDI_DEVICE_REMOVED_REASON_MEM_OVERCOMMIT
0x00000002
#define D3DxxDDI_AV_ACCESS_TYPE_UNKNOWN                 0x00000000
#define D3DxxDDI_AV_ACCESS_TYPE_SAMPLER_REFERENCE       0x00000001
#define D3DxxDDI_AV_ACCESS_TYPE_BUFFER_READ             0x00000002
#define D3DxxDDI_AV_ACCESS_TYPE_BUFFER_WRITE            0x00000004
#define D3DxxDDI_AV_ACCESS_TYPE_SRV_DATA_READ           0x00000008
#define D3DxxDDI_AV_ACCESS_TYPE_SRV_REFERENCE           0x00000010
#define D3DxxDDI_AV_ACCESS_TYPE_UAV_DATA_READ           0x00000020
#define D3DxxDDI_AV_ACCESS_TYPE_UAV_DATA_WRITE          0x00000040
#define D3DxxDDI_AV_ACCESS+TYPE_UAV_REFERENCE           0x00000080
type struct D3DxxDDI_DEVICE_REMOVED_DETAILS
{
  UINT Reason;
  union
  {
    struct AccessViolation
    {
      UINT64 FaultAddress;
      UINT AccessType;
    };
  };
} D3DxxDDI_DEVICE_REMOVED_DETAILS;
void SetErrorCb(D3DxxDDI_HRTCORELAYER, HRESULT,
        const D3DxxDDI_DEVICE_REMOVED_DETAILS*);
```

When the error type is ACCESS_VIOLATION, the AccessType includes a mask of the access types that may have caused the violation. The difference between REFERENCE and DATA_{READ,WRITE} access types is that REFERENCE implies that the fault happened accessing the view descriptor itself, while a DATA error means the fault occurred while accessing the contents of the underlying resource. More than one error type is allowed in case different API-level access-types are implemented using the same hardware features. The FaultAddress is within proximity to the faulting access, or zero if the address cannot be reliably determined.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for accessing data objects stored in a memory that is accessible by a graphics processing unit (GPU), the method comprising:
    creating a data object in the memory based on a command received from an application program;
    transmitting a first handle associated with the data object to the application program such that data associated with different graphics commands can be accessed by the GPU, wherein the first handle includes a memory address that provides access to only a particular portion of the data object;
    receiving a first graphics command as well as the first handle from the application program, wherein the first graphics command includes a draw command or a compute grid launch;
    transmitting the first graphics command and the first handle to the GPU for processing; and
    configuring a shader program associated with the GPU to perform a bindless memory access directed to the data object via the first handle based on the first graphics command;
    wherein the shader program is configured to intermix bound memory accesses directed to the data object with the bindless memory access.

2. The method of claim 1, wherein the GPU is configured to, prior to processing the first draw command, store the first handle in a fixed portion of the memory to facilitate context switching between the first handle and one or more different handles also stored in the fixed portion of the memory.

3. The method of claim 1, wherein the GPU is configured to retrieve the particular portion of the data object from the memory based on the first handle and process the first graphics command using data included in the particular portion of the data object.

4. The method of claim 1, wherein the data object is a texture, and the particular portion of the data object comprises a level of detail included in the texture.

5. The method of claim 1, wherein the data object is a texture, and the particular portion of the data object comprises a subset of an image included in the texture.

6. The method of claim 1, wherein the GPU is configured to issue an error report that references the first handle as well as an error code that specifies a reason that the first graphics command has failed.

7. The method of claim 1, further comprising receiving an additional command transmitted by the application program to guarantee the GPU access to the particular portion of the data object in memory.

8. The method of claim 1, wherein the GPU is configured to retrieve a particular portion of a second data object from the memory based on a second handle that is referenced by the first handle.

9. The method of claim 1, wherein the application program is configured to transmit one or more additional handles associated with one or more additional portions of data objects with the first graphics command such that the one or more additional portions of data objects within the memory can be accessed via a single command.

10. The method of claim 1, wherein the GPU is configured to use only the first handle to access the particular portion of the data object in the memory.

11. The method of claim 1, wherein the first handle comprises a CPU address within a CPU address space.

12. The method of claim 1, where transmitting the first handle to the GPU for processing comprises:
    transmitting the first handle to a data buffer configured to store handles; and
    configuring the shader program to read the first handle from the data buffer.

13. The method of claim 1, further comprising, receiving a command from the shader program to pin the data object to a context.

14. The method of claim 13, further comprising, receiving a command from the shader program to unpin the data object from the context.

15. A non-transitory computer-readable storage medium storing instructions that, when executed by a processor, enable the processor to access data objects stored in a memory that is accessible by a graphics processing unit (GPU), by performing the steps of:
    creating a data object in the memory based on a command received from an application program;
    transmitting a first handle associated with the data object to the application program such that data associated with different graphics commands can be accessed by the GPU, wherein the first handle includes a memory address that provides access to only a particular portion of the data object;
    receiving a first graphics command as well as the first handle from the application program, wherein the first graphics command includes a draw command or a compute grid launch;
    transmitting the first graphics command and the first handle to the GPU for processing; and configuring a shader program associated with the GPU to perform a bindless memory access directed to the data object via the first handle based on the first graphics command;

wherein the shader program is configured to intermix bound memory accesses directed to the data object with the bindless memory access.

16. The computer-readable storage medium of claim 15, wherein the GPU is configured to, prior to processing the first graphics command, store the first handle in a fixed portion of the memory to facilitate context switching between the first handle and one or more different handles also stored in the fixed portion of the memory.

17. The computer-readable storage medium of claim 15, wherein the GPU is configured to retrieve the particular portion of the data object from the memory based on the first handle and process the first graphics command using data included in the particular portion of the data object.

18. The computer-readable storage medium of claim 15, wherein the data object is a texture, and the particular portion of the data object comprises a level of detail included in the texture.

19. The computer-readable storage medium of claim 15, wherein the data object is a texture, and the particular portion of the data object comprises a subset of an image included in the texture.

20. The computer-readable storage medium of claim 15, wherein the GPU is configured to issue an error report that references the first handle as well as an error code that specifies a reason that the first graphics command has failed.

21. The computer-readable storage medium of claim 15, further comprising receiving an additional command transmitted by the application program to guarantee the GPU access to the particular portion of the data object in memory.

22. The computer-readable storage medium of claim 15, wherein the GPU is configured to retrieve a particular portion of a second data object from the memory based on a second handle that is referenced by the first handle.

23. The computer-readable storage medium of claim 15, wherein the application program is configured to transmit one or more additional handles associated with one or more additional portions of data objects with the first graphics command such that an the one or more additional portions of data objects within the memory can be accessed via a single command.

24. A computer system, comprising:
a central processing unit (CPU),
a graphics processing unit (GPU), and
a memory storing a graphics driver configured to:
create a data object in the memory based on a command received from an application program;
transmit a first handle associated with the data object to the application program such that data associated with different graphics commands can be accessed by the GPU, wherein the first handle includes a memory address that provides access to only a particular portion of the data object;
receive a first graphics command as well as the first handle from the application program, wherein the first graphics command includes a draw command or a compute grid launch;
transmit the first graphics command and the first handle to the GPU for processing; and
configure a shader program associated with the GPU perform a bindless memory access directed to the data object via the first handle based on the first graphics command;
wherein the shader program is configured to intermix bound memory accesses directed to the data object with the bindless memory access.

* * * * *

UNITED STATES PATENT AND TRADEMARK OFFICE
CERTIFICATE OF CORRECTION

PATENT NO. : 9,251,551 B2
APPLICATION NO. : 13/078848
DATED : February 2, 2016
INVENTOR(S) : Jesse David Hall and Jeffrey A. Bolz

Page 1 of 1

It is certified that error appears in the above-identified patent and that said Letters Patent is hereby corrected as shown below:

IN THE CLAIMS:

Column 18, Line 7, Claim 23, please delete "an the"

Signed and Sealed this
Thirty-first Day of May, 2016

Michelle K. Lee
*Director of the United States Patent and Trademark Office*